3,163,648
PREPARATION OF MELAMINE
Franz Kaess, Traunstein, Leo Reitter, Neu-Schalchen, and Kurt Scheinost, Tacherting, Germany, assignors to Suddeutsche Kalkstickskstoff-Werke Aktiengesellschaft, Trostberg, Germany
No Drawing. Filed June 14, 1961, Ser. No. 129,923
Claims priority, application Germany June 14, 1960
5 Claims. (Cl. 260—249.7)

The invention relates to the preparation of melamine from urea and/or its thermal decomposition products.

It is known to produce melamine by heating ureas and/or thermal decomposition products thereof such as biuret, cyanuric acid, ammelide, or ammeline at normal or elevated pressure in contact with a catalyst at temperatures of 200 to 450° C. The catalyst must have a large inner surface area which must be of the order of magnitude of at least about 200 m.$^2$/g., and/or a large inner volume and, therefore, have corresponding adsorptive properties. The mixture is preferably heated in the presence of additional ammonia.

Suitable catalysts are active silica gels and active alumine as well as natural diatomite and infusorial earth or clay materials. Compared with catalysts which consist alone or essentially of alumina, silica catalysts have the advantage of giving better melamine yields no matter whether urea itself or its thermal decomposition products are used as starting material and whether the reaction takes place at atmospheric or elevated pressures.

Alumina catalysts, on the other hand, have the advantage to release melamine formed thereon more readily than silica catalysts in all known separation methods, for instance, by aqueous extraction or by the widely used sublimation in a current of hot ammonia. The rate of separation controls the rate of recovery in the bath as well as in the continuous method for the preparation of melamine. It would be a great advantage to combine the favorable rate of separation obtained with alumina catalysts with the high yields obtainable with silica gel catalysts.

It is, therefore, a principal object of the invention to provide a method of increasing the yield of alumina catalysts in the preparation of melamine from urea and its thermal decomposition products.

We have found that such an improved alumina catalyst is obtained when the alumina catalyst which consists wholly or essentially of aluminum oxide in free or chemically bound form, contains, in addition, a certain amount of anions selected from the group consisting of phosphate, borate, arsenate, and sulfate. Hereby, it is of no importance in which manner said ions are introduced into the catalyst, as free acid, as salt, as organic derivative, or as a thermal conversion product of such compounds. Also the manner of introducing such ions into the alumina gel does not affect the catalytic efficiency of the gel. The gel may be impregnated with solution of the free acids or of the salts, or the acids, their salts or organic derivatives may be added to the aluminum salt solution from which the alumina gel is precipitated in known manner. Instead of the acids, also their anhydrides may be used.

The phosphate may be applied as ortho-, pyro-, or metaphosphate, or in the form of organic phosphates; thereby, the pyro or meta form may be produced from the ortho form on the catalyst itself by heating. Also aluminum phosphate gels of varying composition may be used.

The ratio by weight of phosphate to total catalyst may be between 0.01 to 35 percent, calculated as P. For the other catalyst additions, the respective ratios are:

|   | Percent |
|---|---|
| B | 0.0035 to 13 |
| As | 0.02 to 45 |
| S | 0.01 to 28 |

The temperature required for the reaction proper of urea and/or its thermal decomposition products is not changed by the addition of the recited ions to the alumina catalyst and lies between 200 and 450° C.

However, in the recovery of the melamine formed on the catalyst by subliming it off the gel with hot ammonia, the temperature can be lowered, when our novel catalysts are used, without requiring the long sublimation times necessary in recovery of the melamine from silica catalysts. The use of the new catalysts offers, therefore, also advantages in the heat economy of the process.

On subliming off the melamine from the catalyst, its bond to the catalyst must be released by a displacement reaction by means of the ammonia. The weaker bond of the basic melamine to the alumina catalyst, as compared with the bond to the silica catalysts, may be perhaps explained by the lower acidity of the alumina hydrate; said weaker bond is not affected by the ions of the additions which are present in the catalyst as the respective aluminum salt or also, for instance, as sodium salt.

In addition to the advantages recited hereinabove, the use of our novel alumina catalysts of improved efficiency offers the further advantage that their resistance to ammonia and their abrasion resistance compared with silica gel catalysts, is considerably greater, which results is a longer useful life.

The invention will be described more in detail in connection with the following examples. Comparative tests are also given to show the advantages of the novel procedure.

The catalysts used in the examples had already been used before for the same process; for this reason, they were free of water. Any melamine which may have remained in the catalyst from such previous tests was sublimed off by heating the catalyst in ammonia for a time sufficient to remove any such traces of melamine.

All parts are given by weight unless otherwise indicated.

*Example 1*

(a) 75 parts of active alumina gel were mixed with 30 parts of urea and very briefly heated to a temperature just above the melting point of the urea, sufficient to melt the urea and to have it absorbed by the catalyst. The catalyst thus impregnated with urea was then placed in a horizontal reaction tube. Adjoining said catalyst layer (in the direction of flow of the gases), another 75 parts of active alumina, without urea, were introduced as a layer of similar length. The reaction tube was placed into a furnace, and a constant current of ammonia was passed through the tube at a rate of 50 liter/hour during the whole duration of the test. The reaction mass was heated within 30 minutes to 330° C.; this temperature was maintained for 5 hours. During this time, 6.54 parts of melamine had been collected in a part of the reaction tube which projected rearwardly from the furnace and was maintained at 120° C. to prevent precipitation of ammonium carbamate; said 6.54 parts corresponded to a yield of 62.2%.

(b) Test (a) was repeated by using active alumina of the same production which was, however, additionally impregnated with 6 percent by weight of phosphoric acid and which had been dried for 10 hours at 110° C. in a drying cabinet and another 5 hours in a current of ammonia at 350° C. With said catalyst, there were obtained under otherwise the same conditions within 5 hours 9.54 parts of melamine, corresponding to a yield of 90.6%.

(c) In a test which was carried out as set forth under (a) and (b) but in which the active alumina had been replaced by the same amount of silica gel as catalyst, 9.30 parts (yield of 88.5%) of melamine were found in the condensing portion of the reaction tube. However, the considerably longer time of 8 hours had been required to sublime completely the melamine off the catalyst.

(d) If the test (b) the urea was replaced by cyanuric acid, about the same yields were obtained, only the melamine content was higher and amounted to over 99%.

*Example 2*

One test each was carried out with the phosphate impregnated alumina catalyst of Example 1b and the silica gel catalyst of Example 1c. The reaction temperature was 275° C., and the tests were continued until any sublimation of melamine had stopped. The melamine collected in the receiver portion of the reaction tube was weighed every 3 hours. Otherwise the reaction conditions were the same as set forth in Examples 1b and 1c, respectively. The following table gives the amounts of melamine obtained in equal periods of time with the two catalysts.

| Time (hours) | Amount of melamine in percent of theoretical yield | |
|---|---|---|
| | Alumina+ phosphate | Silica gel |
| 3 | 21.9 | 10.5 |
| 6 | 65.5 | 22.9 |
| 9 | 78.5 | 40.4 |
| 12 | 88.6 | 56.7 |
| 15 | 89.5 | 69.8 |
| 18 | 89.5 | 81.6 |
| 21 | | 85.2 |
| 24 | | 87.9 |
| 27 | | 89.0 |
| 30 | | 89.0 |
| 33 | | |

The table shows how much shorter the retention time is when phosphate impregnated alumina catalyst is used instead of silica gel.

*Example 3*

Test 1b was repeated but with an active alumina catalyst which had been impregnated with 5.5% by weight of boric acid in form of an aqueous solution, like the test 1b, had been dried for 10 hours at 110° C. in a drying cabinet and another 5 hours at 350° C. in a current of ammonia.

The apparatus and procedure used were exactly the same as set forth in Example 1a.

There were obtained in the receiver portion of the reaction tube 9.78 parts of a sublimate containing 95.7% of melamine, corresponding to a yield of 89.2%.

*Example 4*

In this example, the preceding test was repeated with a catalyst prepared by imprenating active alumina with 13% by weight of arsenic acid (in form of an aqueous solution) and drying the catalyst first for 10 hours in a drying cabinet at 110° C. and then 6 more hours in a current of ammonia at 350° C.

Under the same conditions as set forth in the preceding examples, there were obtained in a 5-hour reaction period, 9.20 parts of sublimate containing 97.4% of melamine corresponding to a yield of 85.4%.

*Example 5*

The same apparatus and procedure was used as described in the preceding examples. As catalyst, we used active alumina impregnated with 9% by weight of sulfuric acid (in form of an aqueous solution), and dried for 10 hours in a drying cabinet at 110° C. and additional 6 hours at 350° C. in a current of ammonia.

This catalyst produced under the conditions set forth in Example 1 in a 5-hour reaction period 9.90 parts of sublimate containing 96.3% of melamine, corresponding to 90.8% of theory.

When producing the catalyst according to the invention one may start from active alumina normal in commercial usage. The latter can however also be produced in a known manner, e.g. according to the suggestion given by L. Harvestadt and R. Fricke ("Zeitschrift für anorganische Chemie 188 (1930) 378").

The concentration of the acid solution to be used for impregnating is suitably chosen in such a manner that the amount of fluid given by this can just be sucked up by the predetermined amount of alumina.

We claim:
1. A method of preparing melamine comprising mixing a member of the group consisting of urea and solid thermal decomposition products thereof with an active alumina catalyst having an inner surface of at least about 200 m.$^2$/g. and containing ions selected from the group consisting of phosphate, borate, arsenate, and sulfate, heating the mixture under substantially normal pressure at a temperature of 200 to 450° C. in ammonia, and collecting the sublimed melamine.

2. The method claimed in claim 1 wherein the catalyst contains phosphate in an amount of 0.01 to 35 percent by weight of P, based on the total weight of the catalyst.

3. The method claimed in claim 1 wherein the catalyst contains borate in an amount of 0.0035 to 13 percent by weight of B, based on the total weight of the catalyst.

4. The method claimed in claim 1 wherein the catalyst contains arsenate in an amount of 0.02 to 45 percent by weight of As, based on the total weight of the catalyst.

5. The method claimed in claim 1 wherein the catalyst contains sulfate in an amount of 0.01 to 28 percent by weight of S, based on the total weight of the catalyst.

References Cited in the file of this patent

UNITED STATES PATENTS

| 2,550,659 | Vingee | Apr. 24, 1951 |
| 2,615,019 | Klapproth | Oct. 21, 1952 |
| 2,776,286 | Lobdell | Jan. 1, 1957 |
| 2,902,488 | Jackson et al. | Sept. 1, 1959 |
| 3,054,796 | Fisher et al. | Sept. 18, 1962 |

FOREIGN PATENTS

| 552,932 | Canada | Feb. 11, 1958 |
| 561,303 | Canada | Aug. 5, 1958 |